United States Patent [19]
Iseda

[11] Patent Number: 5,054,768
[45] Date of Patent: Oct. 8, 1991

[54] SHEET CONVEYING APPARATUS

[75] Inventor: Ken Iseda, Kanagawa, Japan

[73] Assignee: Kabushiki Kaisha Toshiba, Kawasaki, Japan

[21] Appl. No.: 499,965

[22] Filed: Mar. 27, 1990

[30] Foreign Application Priority Data

Mar. 27, 1989 [JP] Japan ................................. 1-071943

[51] Int. Cl.⁵ ............................................ B65H 29/20
[52] U.S. Cl. ..................................... 271/291; 271/902
[58] Field of Search ................................ 271/902, 291

[56] References Cited

U.S. PATENT DOCUMENTS

| 4,412,740 | 11/1983 | Buddendeck | 271/902 X |
| 4,744,553 | 1/1987 | Hirose | 271/3.1 |
| 4,921,239 | 5/1990 | Okui | 271/902 X |

Primary Examiner—Richard A. Schacher
Attorney, Agent, or Firm—Banner, Birch, McKie & Beckett

[57] ABSTRACT

A copying apparatus includes an automatic document feeding apparatus (hereinafter referred to or RADF) for automatically feeding a document onto the platen glass table for copying and for re-feeding the document onto the glass table after the document is reversed. The RADF has an upper roller with a large radius and a lower roller with a small radius. First, second, and third gates are located along the periphery of the upper roller. When feeding the document, the first and second gates define a document path from a document feed tray to the platen glass table. When reversing the document, the first, second, and third gates define a document path for reversing the document and re-feeding the reversed document onto the platen glass table. When ejecting the document, the second and third gates define a document path from the platen glass table onto a surface of the RADF.

12 Claims, 10 Drawing Sheets

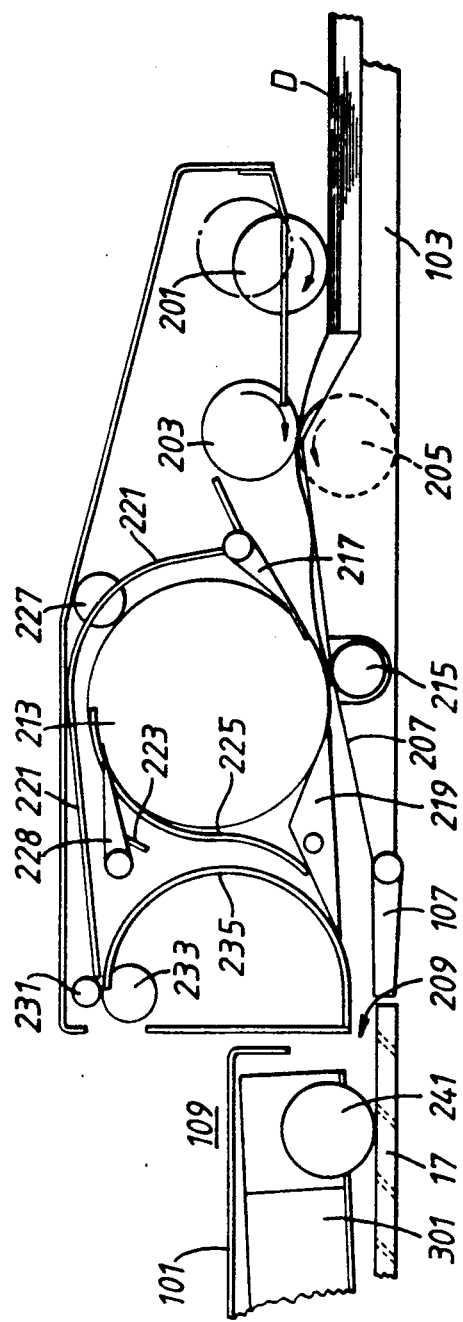
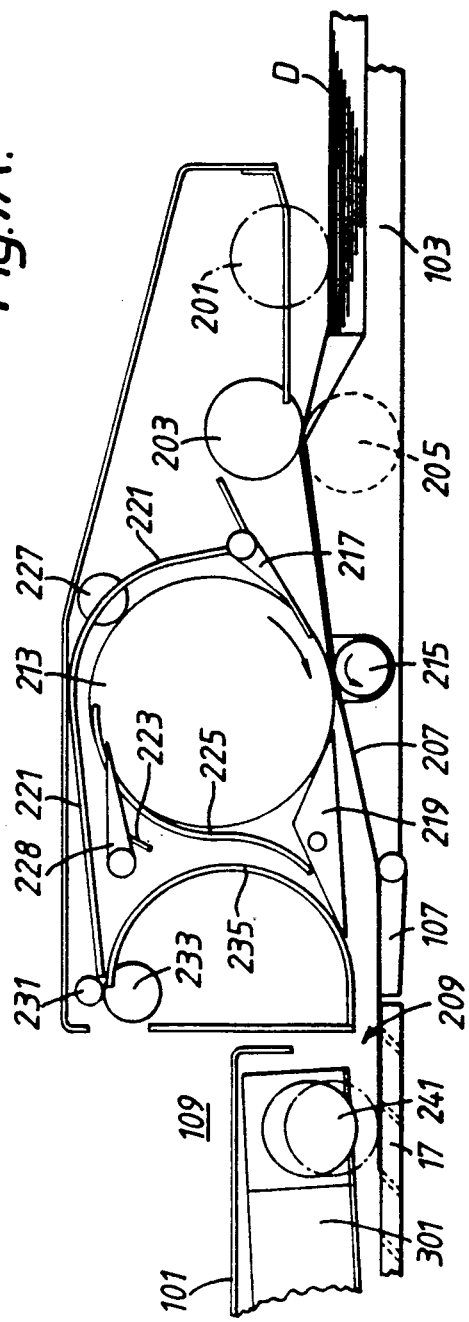

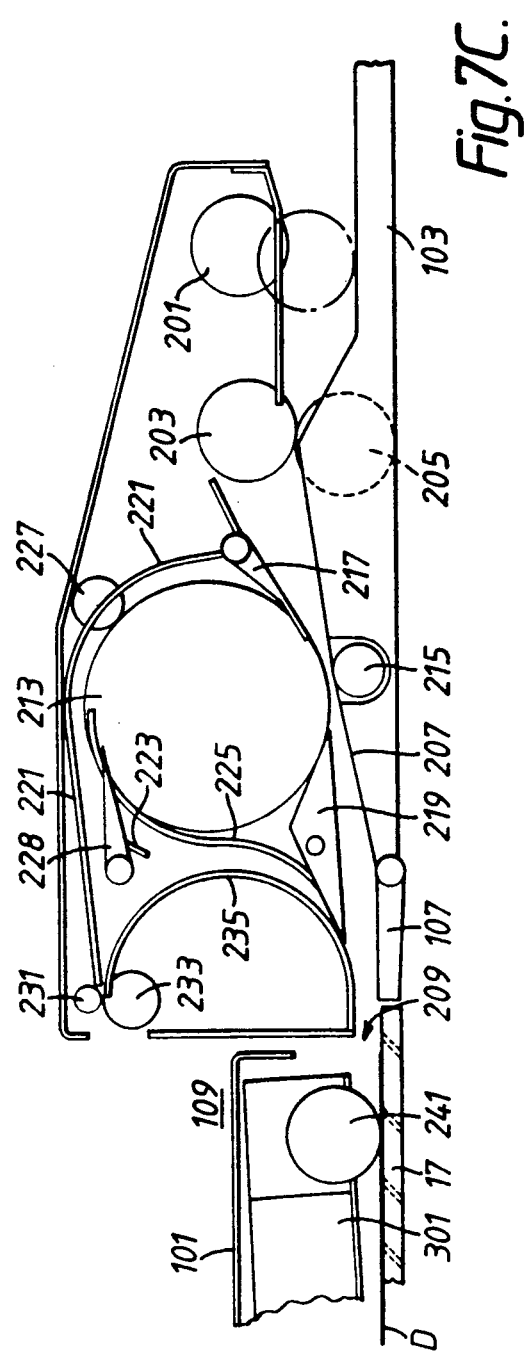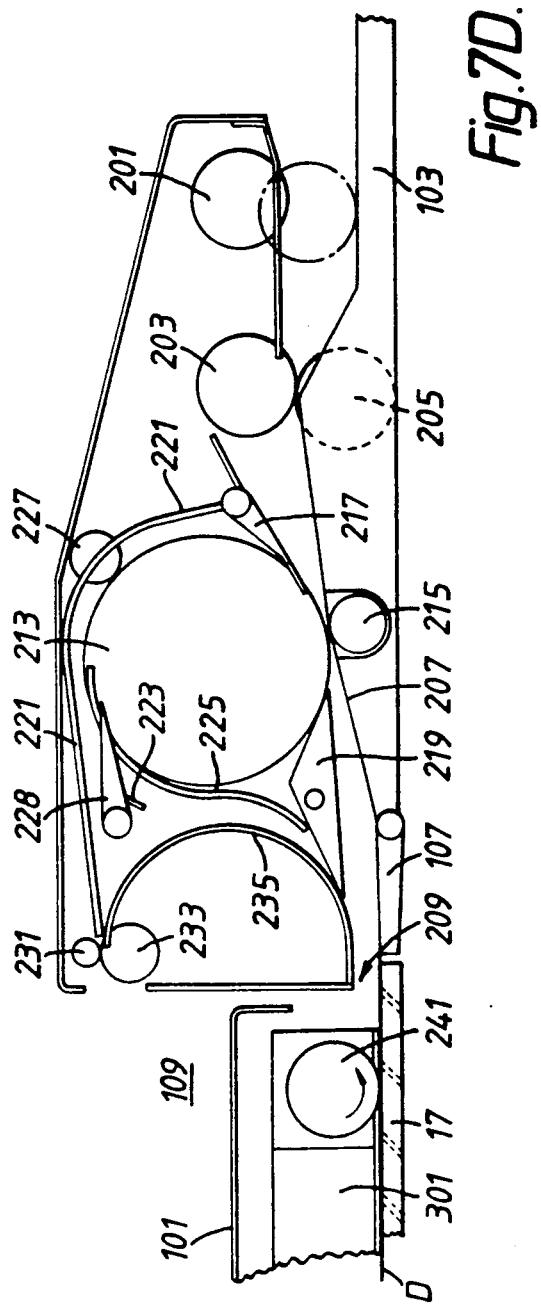

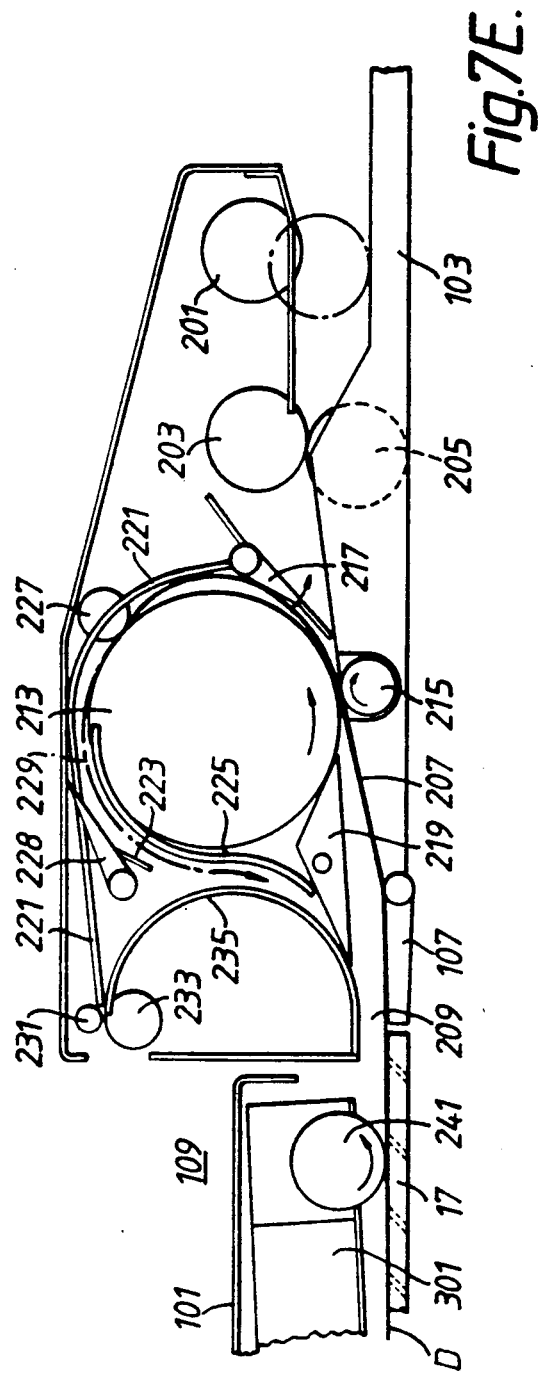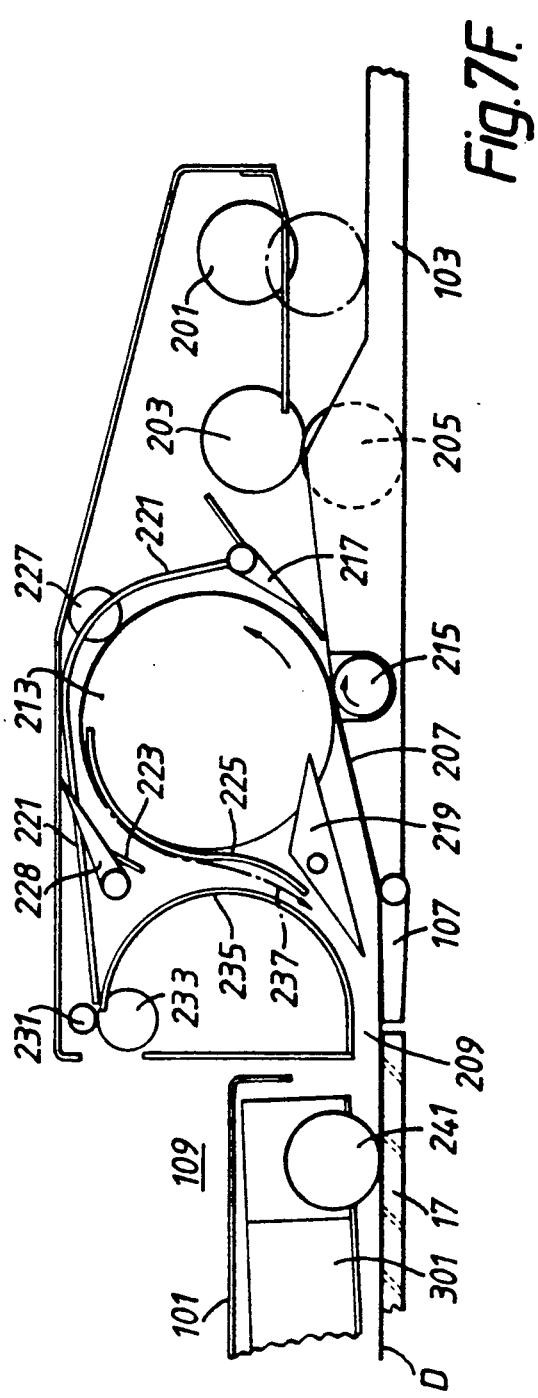

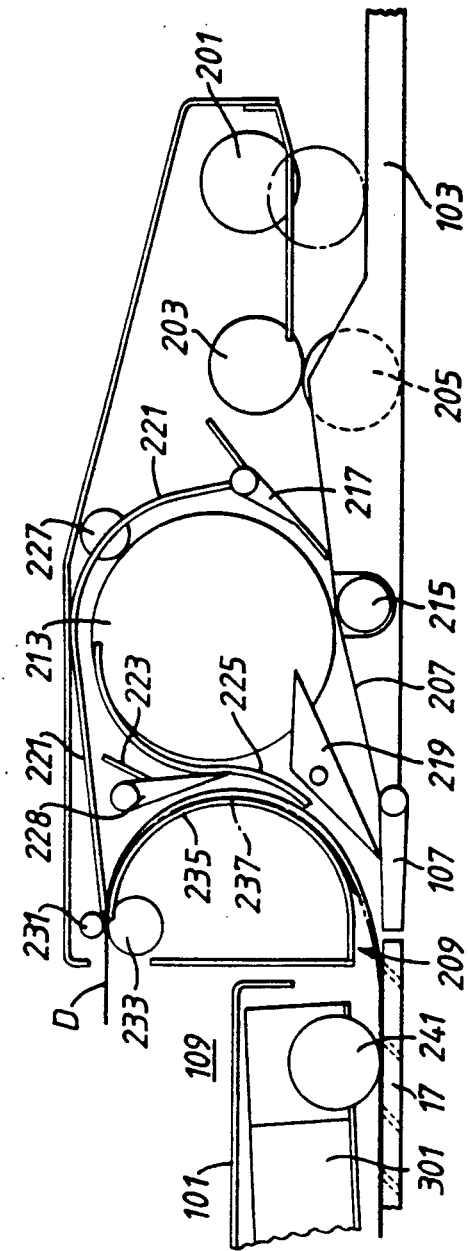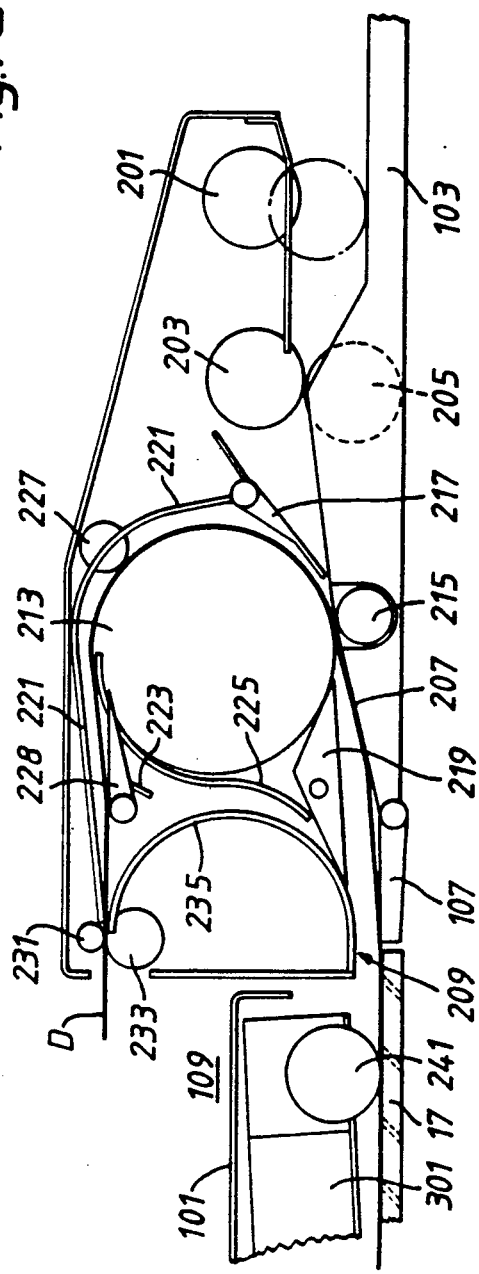

SHEET CONVEYING APPARATUS

BACKGROUND OF THE INVENTION

1. Field of the Invention

This invention relates generally to a sheet conveying apparatus, and more particularly to an image forming apparatus having an automatic paper feed device which is capable of reversing the paper for copying.

2. Description of the Related Art

A copying machine makes a copy of an original document, which is supported on a platen glass table of the machine. To facilitate the copying of a plurality of originals, some copiers also include an automatic document feeding apparatus (hereinafter referred to as ADF). The automatic document feeding apparatus feeds originals automatically onto the platen glass table and ejects the originals after the copying operation is completed. Further, if it is desired to copy both sides of the original, the ADF automatically reverses the original after copying one side of the document.

This apparatus is not entirely satisfactory, however, because the mechanism for reversing the original is complicated and the size of the mechanism is also undesirably large.

SUMMARY OF THE INVENTION

Accordingly, it is an object of the present invention to provide a sheet conveying apparatus which is less complicated in structure and which is smaller than the devices previously known.

It is further object of the present invention to provide a sheet conveying apparatus which is capable of more reliable operation.

In accordance with the present invention, a sheet conveying apparatus is provided for conveying a sheet from a stack to a first position, reversing the sheet and reconveying the sheet to the first position after the sheet is reversed, and conveying the sheet from the first position to a second position. The apparatus comprises first conveying means for conveying a sheet from the stack toward the first position. Second conveying means conveys the sheet from the first position toward the stack. Third conveying means is disposed between the first conveying means and the second conveying means for further conveying the sheet conveyed by the first conveying means to the first position and for reversing and further conveying the sheet conveyed by the second conveying means to the first position or to the second position.

BRIEF DESCRIPTION OF THE DRAWINGS

Other objects and many of the attendant advantages of this invention will be readily appreciated as the invention becomes better understood by reference to the following detailed description when considered in connection with the accompanying drawings, in which like reference numerals designate the same or similar parts throughout the figures thereof and wherein;

FIGS. 7A through 7G illustrate the operation of the feed/eject/reverse mechanism shown in FIG. 3; and FIG. 8 illustrate the operation of the feed/eject/reverse mechanism according to a second embodiment of the present invention.

DETAILED DESCRIPTION OF THE PREFERRED EMBODIMENTS

Figure 1:
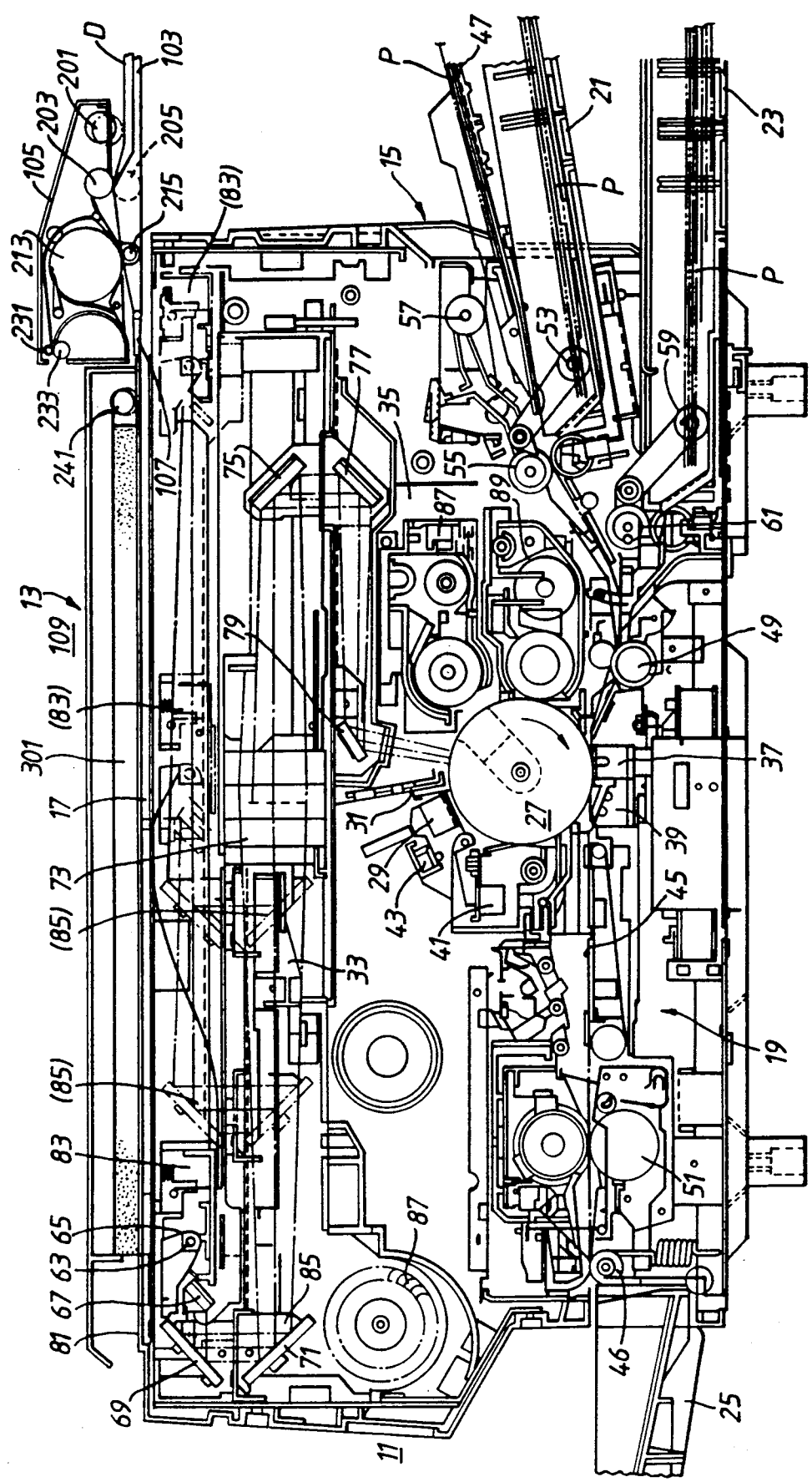
FIG. 1 is a sectional view of a copying machine according to the present invention.

Referring now to FIG. 1, an image forming apparatus, such as a copying machine 11, according to the present invention, includes a reversing automatic document feeder 13 (hereinafter referred to as RADF), provided on the upper surface of a main body 15. RADF 13 automatically feeds an original document D onto a platen glass table 17 for copying, reverses original D and resets the document on the glass table for copying the reverse side, and ejects original D from platen glass table 17 after the copying operation is completed.

Main body 15 includes an image forming device 19, positioned below RADF 13, for forming an image in accordance with document D positioned on platen glass table 17.

An upper cassette 21 and a lower cassette 23 are provided at the right side of main body 15, and store paper sheets P which are fed to image forming device 19. Sheet tray 25 is provided at the left side of main body 15 for receiving and stacking paper sheets P after they have been subjected to image formation.

Image forming device 19 comprises a photosensitive drum 27, which is disposed substantially at the center of main body 15. The image forming device also comprises a charging unit 29 for uniformly charging the surface of photosensitive drum 27. An erasing unit 31 discharges a portion of the charge from photsenitive drum 27 in accordance with the size of document D to be copied.

An exposure unit 33 exposes the charged surface of photosensitive drum 27 after erasing to form a latent image corresponding to document D. A developing device 35 develops the latent image on the surface of photosensitive drum 27 with a toner. A transferring unit 37 then transfers the toner image from the surface of photosensitive drum 27 to a paper sheet P supplied from either upper cassette 21 or lower cassette 23.

A separating unit 39 separates paper sheet P with the toner image from photosensitive drum 27. A cleaning unit 41 scraps the residual toner off the surface of photosensitive drum 27 after separating paper sheet P. A discharging unit 43 discharges the surface of photosensitive drum 27 to return the surface potential to its initial state. As can be seen from FIG. 1, these units are sequentially arranged around photosensitive drum 27 in the rotational direction of the drum.

The conveyance of paper sheets P will now be described.

Paper sheets P are automatically fed from upper cassette 21 or lower cassette 23, or are manually fed through a manual feed table 47, which also serves as a cover of upper cassette 21, and are conveyed along a paper convey path 45 formed in main body 15. Paper convey path 45 guides paper sheets P through a space between photosensitive drum 27 and transferring unit 37 toward a pair of eject rollers 46, positioned at the left side of main body 15.

A pair of aligning rollers 49 are arranged at the upstream side of transferring unit 37 along paper convey path 45. A fixing device 51 is arranged at the downstream side of the paper convey path.

A pickup roller 53, attached to a swingable arm, picks up paper sheets P one by one from upper cassette 21. A separation convey device 55 is disposed near the forward end of upper cassette 21 and comprises a convey roller and a separation roller. Separation convey device 55 receives paper sheet P from pickup roller 53 and feeds paper sheet P toward the upstream end of paper convey path 45. A manual feed roller 57, disposed near the inner edge of manual feed table 47, feeds a paper sheet P from manual feed table 47 toward the upstream end of paper convey path 45.

A pickup roller 59, attached to a swingable arm, picks up paper sheets P, one by one, from lower cassette 23. A separation convey device 61 is positioned near the forward end of lower cassette 23. Separation convey device 61 receives paper sheet P from pickup roller 59 and feeds the paper sheet toward the upstream end of paper convey path 45. Separation convey device 61 is substantially identical in construction to separation convey device 55.

Exposure unit 33 comprises an exposure lamp 63. A reflector 65 surrounds the back surface of exposure lamp 63 to project light from exposure lamp 63 onto original document D set on platen glass 17. A first mirror 67, a second mirror 69, a third mirror 71, a lens 73, a fourth mirror 75, a fifth mirror 77, and a sixth mirror 79 sequentially guide light reflected by original document D toward photosensitive drum 27. The direction of light emitted from exposure lamp 63 is slightly inclined by reflector 65 from a direction perpendicular to platen glass table 17 in the direction of a left scale 81.

Exposure lamp 63, reflector 65, and first mirror 67 are mounted on a first carriage 83 which can be reciprocally moved between the left and right ends of platen glass table 17 along the lower surface of platen glass table 17. Second and third mirrors 69 and 71 are mounted on a second carriage 85 which is moved in the same direction as first carriage 83, but at a speed which is one-half the speed of first carriage 83. First and second carriages 83 and 85 scan original document D set on platen glass table 17 when carriages 83 and 85 are moved from left to right, thus forming a latent image on the surface of photosensitive drum 27 which corresponds to original document D.

Developing device 35 comprises an upper developing unit 87 for color development and a lower developing unit 89 for black development. Development by black or another color (e.g., red) can be selected.

Copying machine 11 also includes a cooling fan 87, positioned above fixing device 51, for cooling the interior of main body 15.

Figure 2:
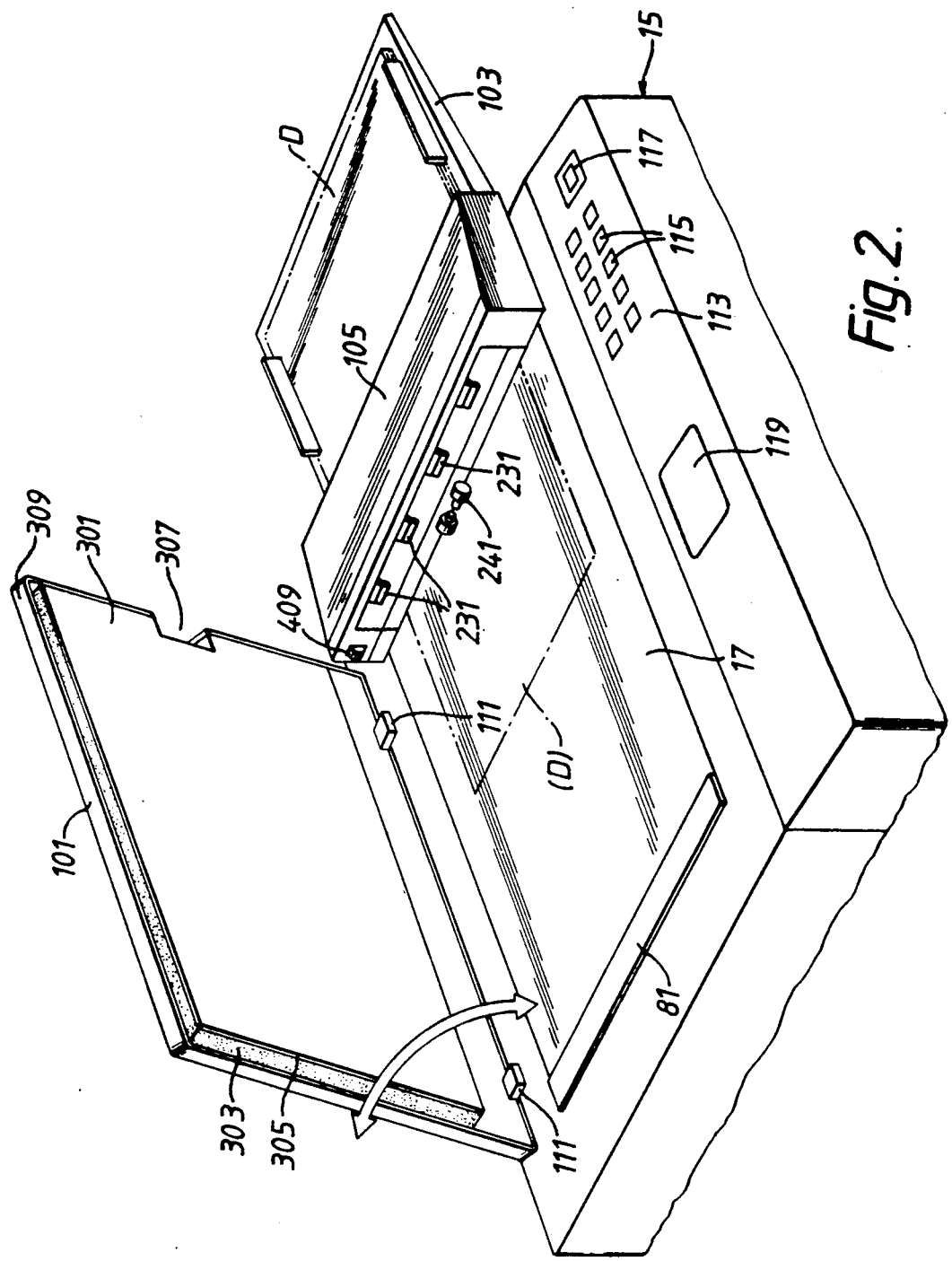
FIG. 2 is a perspective view of the top surface of the copying machine shown in FIG. 1.

Referring now to FIG. 2, RADF 13 comprises a platen cover 101 for covering platen glass table 17, and a document feed tray 103, which extends to the right from the right end portion of the upper surface of main body 15, for receiving and stacking a plurality of original documents D. An original feed/eject/reverse mechanism (FER) 105 is located between platen cover 101 and document feed tray 103 on the upper surface of main body 15. FER 105 sequentially picks up documents D from document feed tray 103 one by one, and feeds the original document forward between platen cover 101 and platen glass table 17. FER 105 then sets document D at a predetermined position on platen glass table 17, with reference to a right scale 107 (see FIG. 1), for copying. Once the copying operation is complete, FER 105 ejects document D from between platen cover 101 and platen glass table 17 onto a document eject tray 109 (see FIG. 1), which is formed in a hollow area provided on the upper surface of platen cover 101.

As shown in FIG. 2, platen cover 101 is attached to the upper surface of main body 15 through a pair of hinge members 111 so that platen cover 101 is openable and closable with respect to platen glass table 17. Hinge members 111 are movable in the vertical direction within a predetermined range with respect to the upper surface of main body 15. When a thick original, such as a book, is set on platen glass table 17 to be copied, platen cover 101 can be uniformly pressed against the thick original so that the cover is parallel to platen glass table 17.

An operation panel 113 is located on the front edge portion of the upper surface of main body 15, and includes a ten-key pad 115 for inputting control information. Operation panel 113 also includes a copy start key 117 for causing copying machine 11 to begin copying, and a guide display 119 for displaying a plurality of information about the operation of the copying machine.

Figure 3:
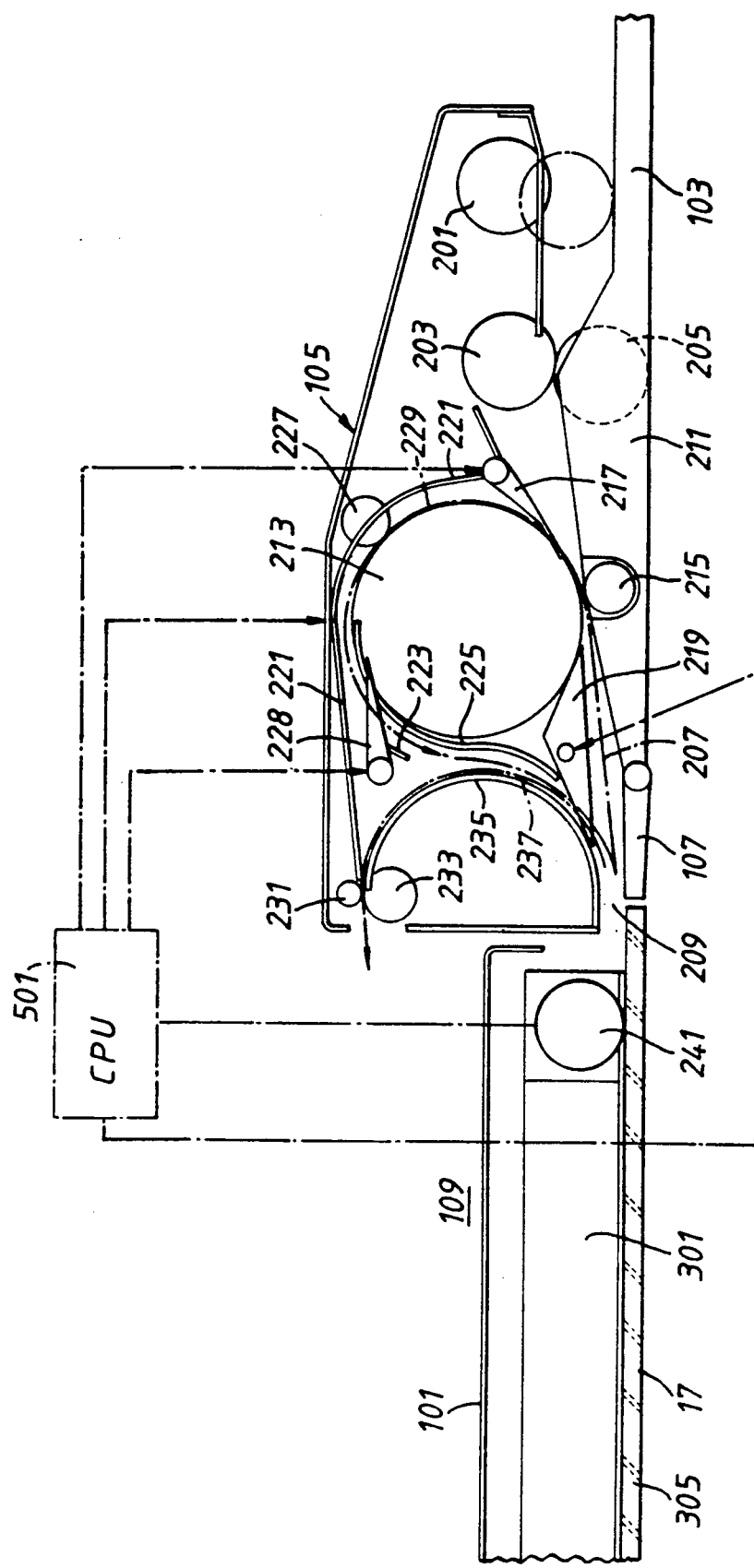
FIG. 3 is a sectional view of an original feed/eject/reverse mechanism used in the copying machine shown in FIG. 1.

Referring now to FIG. 3, FER 105 will be detailed.

FER 105 includes a pickup roller 201 which is vertically movable, by a drive mechanism such as a solenoid (not shown), with respect to a stack of original documents D positioned in document feed tray 103. A feed roller 203 and a separation roller 205 are in contact with each other in the vertical direction at a position located away from pickup roller 201, and are rotatable by a drive device (not shown) to feed document D in a forward direction. A guide 211 defines a feeding path 207 which extends from the contact point between feed roller 203 and separation roller 205 to a feeding exit 209 located at the forward end of FER 105.

Figure 6:
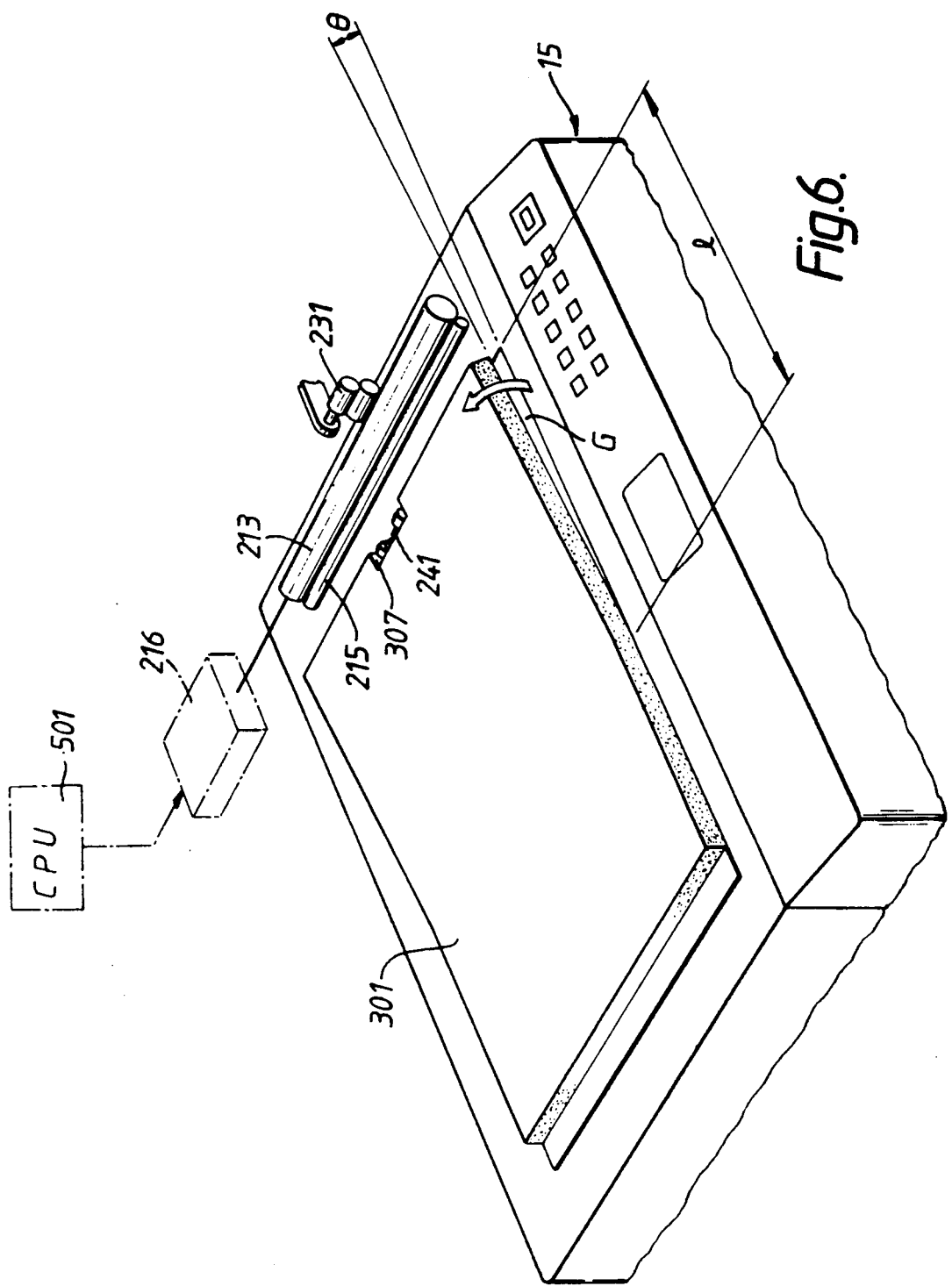
FIG. 6 is an exploded perspective view of the platen cover shown in FIG. 4.

A upper roller 213 with a large radius, e.g., 50 mm, and a lower roller 215 with a small radius, e.g., 12 mm, are provided along feeding path 207. Rollers 213 and 215 serve as aligning rollers and roller 213 also acts as a reversing roller to reverse document D as it travels along the surface of the roller. Rollers 213 and 215 are reciprocally rotated in a first direction and in a second opposite direction by a motor 216 coupled to a CPU 501 (FIG. 6).

A first gate 217 and a second gate 219 are provided adjacent roller 213 for defining the path of travel of document D. In addition, a first guide 221, a second guide 223, and a third guide 225 are positioned along the peripheral surface of roller 213 for guiding document D as the document is transported by roller 213. A pinch roller 227 is in contact with the peripheral surface of roller 213 to press document D against the surface of roller 213. A third gate 228 is also located adjacent roller 213 for defining the path of document D, as described later.

A reversing path 229 extends from feeding exit 209 and back through a path defined by roller 213 and first, second, and third guides 221, 223, and 225.

A pair of eject rollers 231 and 233 are positioned proximate the upper portion of FER 105, and are rotated by a drive mechanism (not shown) to eject document D onto document eject tray 109.

A fourth guide 235 is located between feeding exit 209 and eject rollers 231 and 233, facing third guide 225. A eject path 237 extends from feeding exit 209 to eject rollers 231 and 233 along fourth guide 235.

Right scale 107 is provided at the end of the feeding path near feeding exit 209. Right scale 107 is rotatable about its right end by a motor (not shown). When the left end of right scale 107 is in a down-state (hereinafter referred to as a first state), document D is able to pass over right scale 107. Conversely, when the left end of right scale 107 is in an up-state (hereinafter referred to as a second state), document D is stopped at the left end of right scale 107. In the first state, right scale 107 serves as a part of feeding path 207. In the second state, right scale 107 serves as a stopper for setting document D on table 17, as described later.

A feed/eject roller 241 is positioned to the left of right scale 107 on the right end of table 17. Feed/eject roller 241 is brought into contact with or separated from table 17, and is selectively rotated in the forward or reverse direction by a drive device (not shown) to either feed document D from rollers 213 and 215 onto table 17 or to eject document D from table 17 to the inside of FER 105.

First gate 217, second gate 219, and third gate 228 are coupled to CPU 501, and are selectively positioned in one of two positions under the control of the CPU. In one position, first gate 217 opens feeding path 207 and interrupts reversing path 229. First gate 217, located in the other position, opens reversing path 229 and interrupts feeding path 207. Second gate 219, located in one position, interrupts reversing path 229 and opens feeding path 207. Second gate 219, located in the other position, opens reversing path 229 and interrupts the feeding path. Third gate 228, in accordance with first and second gates 217 and 219, either opens or interrupts reversing path 229 connecting with feeding exit 209 or interrupts or opens a path connecting with eject rollers 231, 233.

The detail of platen cover 101 will now be explained. As shown in FIG. 2, platen cover 101 includes a platen sheet 301 having substantially the same planar dimensions as table 17. Platen sheet 301 includes an elastic member 303 of urethane or the like. A white sheet 305 is adhered to the lower surface of elastic member 303, and has a low coefficient of friction. A notch 307 is formed at the center of the right end of platen sheet 301.

Figure 4:
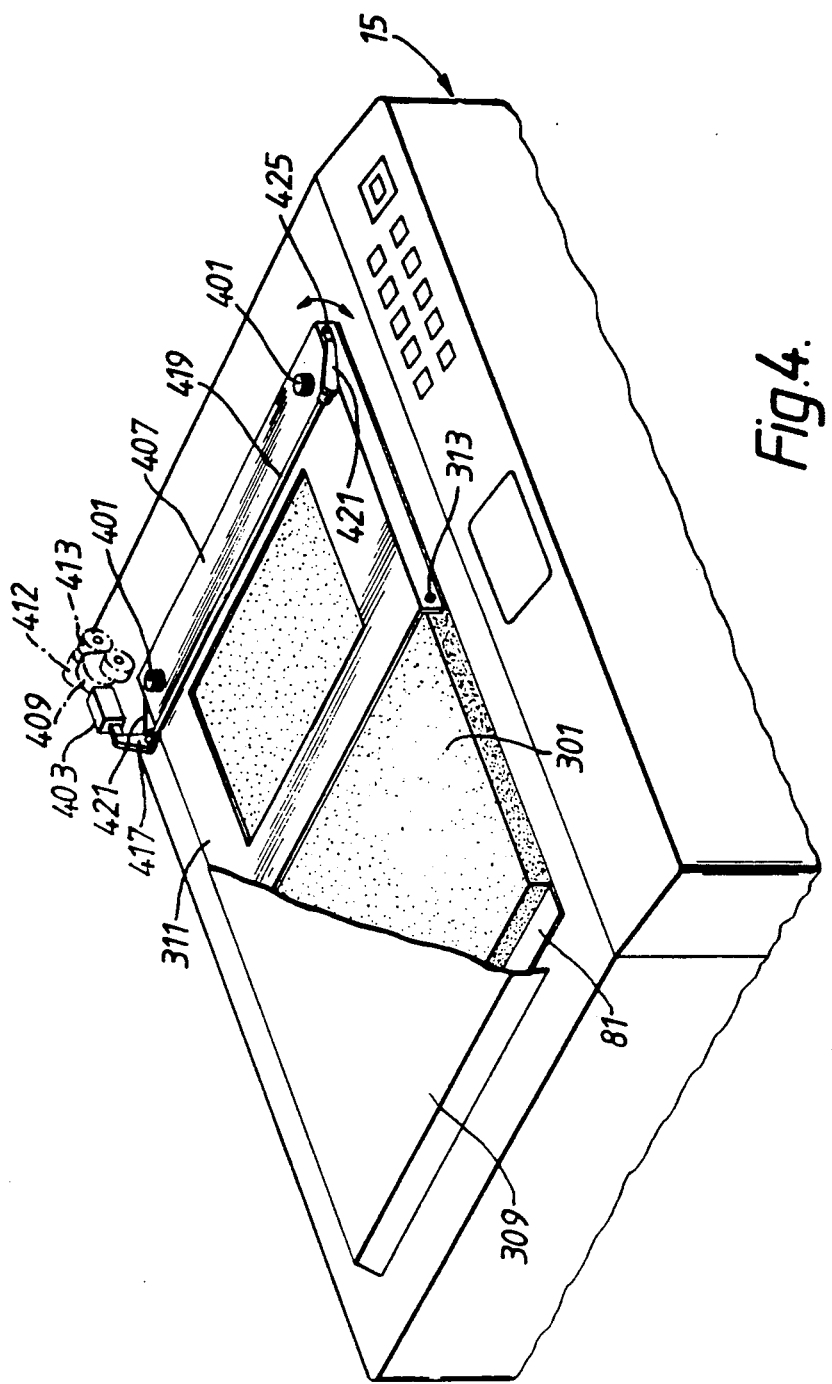
FIG. 4 is an exploded perspective view of a platen cover used in the copying machine shown in FIG. 1.

Referring now to FIG. 4, platen sheet 301 is covered (except on its lower surface) with a cover body 309. Cover body 309 is attached to the rear portion of the upper surface of main body 15 through hinge members 111, as described above. The left hand portion of platen sheet 301 is directly fixed to the left hand portion of the inner surface of cover body 309. The right hand portion of platen sheet 301 is coupled to a movable frame 311, which is pivotally mounted on the right hand portion of the inner surface of cover body 309. Movable frame 311 is supported on cover body 309 by a pair of pivot supports 313 (only the front one is illustrated) positioned at substantially the center of cover body 309.

Figure 5:
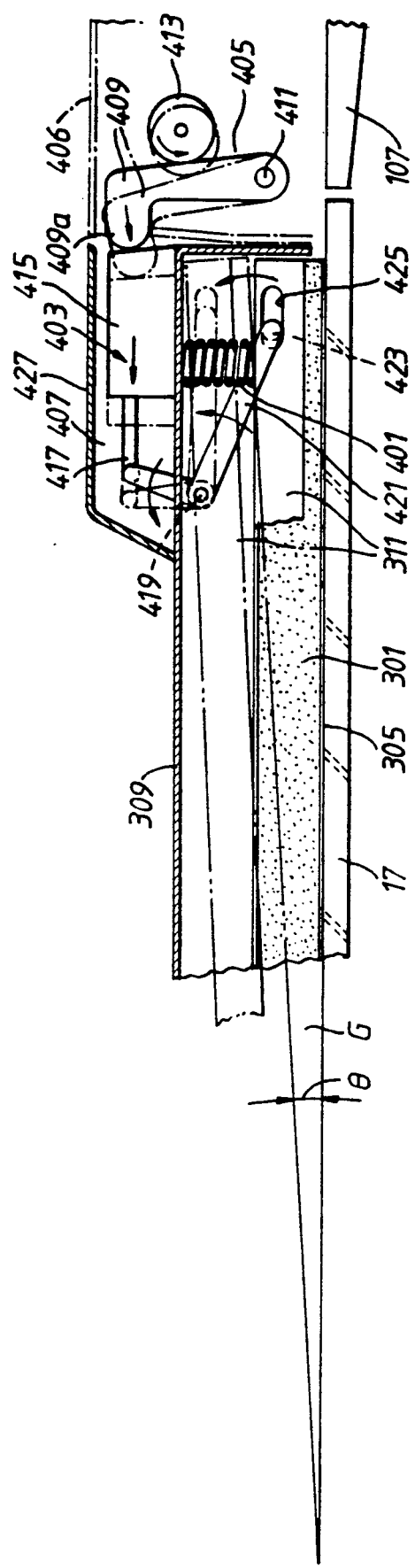
FIG. 5 is a sectional view of a mechanism for moving a platen sheet used in the platen cover shown in FIG. 4.

Referring now to FIG. 5, compression springs 401 are disposed between the free end portion (right end portion) of the upper surface of movable frame 311 and the bottom surface of cover body 309. Compression springs 401 urge the free end portion of movable frame 311 downward, as indicated by a solid line in FIG. 5, to bring platen sheet 301 into tight contact with table 17.

Movable frame 311 is pivoted upward by a predetermined angle against the urging forces of compression springs 401 by a gap forming device 403 (to be described in detail later). In FIG. 5, movable frame 311 pivoted to an upward position is illustrated by a two-dot chain line. In this state, a gap G having an angle $\theta$ and a length l is formed under the right hand portion of the lower surface of platen sheet 301 as shown in FIG. 6.

As shown in FIG. 5, gap forming device 403 comprises a drive mechanism 405 arranged in a cover 406 covering FER 105, for generating a pressing force. A power transmission mechanism 407, arranged in a cover 427 attached to the right end portion of platen cover 101, transmits the force generated by drive mechanism 405 to movable frame 311.

Drive mechanism 405 comprises an inverted L-shaped pusher 409 which is pivotal about a shaft 411 as a fulcrum. Mechanism 405 also comprises an eccentric cam roller 413 and a drive motor 412 (see FIG. 4). Pusher 409 is urged by an urging device (not shown) into contact with the peripheral surface of eccentric cam roller 413, so that rotation of eccentric cam roller 413 causes swing movement of pusher 409. A projecting side portion 409a of pusher 409 then projects from or is retracted into an opening formed in the left end face of cover 406.

Power transmission mechanism 407 includes a slider 415. One end face of slider 415 opposes projecting side portion 409a of pusher 409. Slider 415 is reciprocal in the moving direction of side projecting portion 409a of pusher 409. The other end face of slider 415 is coupled, through a link mechanism 417, to one end of a shaft 419. Shaft 419 is rotatably supported in a space between the bottom surface of cover body 309 and the upper surface of movable frame 311. Pivot levers 421 extend toward the free end portions of the two side walls of movable frame 311, and are fixed on the two ends of shaft 419. The extending ends of pivot levers 421 support guide rollers 423, which are themselves engaged with horizontal guide grooves 425 formed in the free end portions of the two side walls of movable frame 311. In power transmission mechanism 407, the sliding movement of slider 415 is converted to rotation of shaft 419 by link mechanism 417. Shaft 419 pivots pivot levers 421 within a predetermined angular range.

When gap forming device 403 is in a rest state, i.e., when drive mechanism 405 is not activated, a minimum eccentric position on the peripheral surface of eccentric cam roller 413 is in surface contact with pusher 409, as indicated by a solid line in FIG. 5, and projecting side portion 409a of pusher 409 is retracted in cover 406. Because projecting side portion 409a of pusher 409 fails to push slider 415, movable frame 311 is urged downwardly by compression springs 401 so that platen sheet 301 is brought into tight contact with platen sheet 301, which, in turn, is brought into tight contact with platen glass table 17.

Whenever an original document D is fed onto, or ejected from, platen glass table 17, motor 412 is driven to rotate eccentric cam roller 413 by 180° in response to a signal from a control unit (not shown). As a result, as indicated by a two-dot chain line in FIG. 5, a maximum eccentric position on the peripheral surface of eccentric cam roller 413 is brought into contact with pusher 409. Pusher 409 is then pivoted so that its projecting side portion 409a projects from the opening in the left end face of cover 406. Slider 415 is then pushed by projecting side portion 409a and is slid to the left in cover 427.

This movement of slider 415 causes counterclockwise pivotal movement of pivot levers 421. As a result, movable frame 311 is pivoted counterclockwise about pivot supports 313 (see FIG. 4) so that the free end portion of movable frame is pushed up against the urging forces of compression springs 401. The right hand portion of platen sheet 301 is separated upward from platen glass table 17 and gap G, described above, is formed below the lower surface of platen sheet 301, as shown in FIG. 6.

The operation of FER 105 will now be described with reference to FIGS. 7A through 7H.

As shown in FIG. 7A, at the start of the copying operation, a plurality of original documents D are positioned in document feed tray 103 with their image surfaces facing downward, and copy start key 117 (see FIG. 2) is depressed. In response to the operation of key 117, pickup roller 201 is moved downward, and is brought into contact with the uppermost document in document feed tray 103. Pickup roller 201, feed roller 203, and separation roller 205 are then rotated so that the document is picked up from document feed tray 103.

In this state, drive mechanism 405 of gap forming device 403 is operated to cause pusher 409 to push slider 415, as described above with reference to FIGS. 4 and 5. As a result, as shown in FIG. 6, gap G is formed between platen glass table 17 and platen sheet 301.

Once document D has been picked up from document feed tray 103, the document is advanced to rollers 213 and 215 so that its leading end is parallel to the contact line between rollers 213 and 215.

When upper and lower rollers 213 and 215 are rotated, document D is conveyed to the left. As shown in FIG. 7B, right scale 107 is set in the first state, e.g., the free end of right scale 107 is in the down state, and forms part of feeding path 207.

In response to the rotation of upper and lower rollers 213 and 215, feed/eject roller 241 is separated from the surface of platen glass table 17. Before the trailing end of original D leaves upper and lower rollers 213 and 215, and at a time when document D has reached under feeding/eject roller 241, feed/eject roller 241 is brought into contact with the surface of glass table 17. Feed/eject roller 241 then presses document D against the surface of platen glass table 17. Document D then is conveyed to the left along platen glass table 17 with the rotation of feed/eject roller 241. In this case, even though the length of document D is greater than the length l of gap G, the leading end (left end) of the document is able to smoothly pass between platen sheet 301 and platen glass table 17 without being bent or curved. This is because platen glass table 17 and white sheet 305 on the lower surface of platen sheet 301 are low-friction members.

Referring now to FIG. 7C, when a sensor (not shown) detects that the trailing end (right end) of document D has moved to a position away from right scale 107, feed/eject roller 241 stops rotating. At the same time, the motor is activated to change right scale 107 from the first state to the second state, i.e., the left end of right scale 107 moved to the up-state.

Referring now to FIG. 7D, feed/eject roller 241 is then rotated in the reverse direction to move document D to the right along platen glass table 17. When the right end of document D abuts against right scale 107, feed/eject roller 241 stops rotating. Thereafter, drive mechanism 405 is operated to retract projecting side portion 409a of pusher 409 into cover 406. Movable frame 311 is, thus, moved downwardly by the restoration forces of compression springs 401 so that platen sheet 301 is brought into contact with platen glass table 17, as shown in FIG. 7D.

Once document D has been set in this manner on the upper surface of platen glass table 17, document D is scanned by exposure unit 33 (see FIG. 1). The image on document D is then copied onto paper sheet P as described above.

When the copying operation is completed, right scale 107 is returned to the first state, i.e., the left end of the scale is moved downwardly, as shown in FIG. 7E, and platen sheet 301 is moved upward to form Gap G. At the same time, first gate 217 is moved down so that first gate 217 interrupts feeding path 207 and opens reversing path 229. Third gate 228 is also moved upward, which opens reversing path 229 and interrupts the path connecting with eject rollers 231, 233.

Feed/eject roller 241 is then rotated counterclockwise to convey document D located on platen glass table 17 to the right. Once document D reaches upper and lower rollers 213 and 215, upper and lower rollers 213 and 215 are rotated and feed/eject roller 241 is stopped. As upper and lower rollers 213 and 215 are rotated, document D is conveyed along reversing path 229 located along the periphery of upper roller 213, e.g., along first gate 217 in the down state, and first, second, and third guides 221, 223, and 225.

After upper and lower roller 213 and 215 begin conveying document D, second gate 219 is moved to a down state so that a path is opened to feeding exit 209 as shown in FIG. 7F. During rotation of roller 213, as document D is conveyed along the surface of the roller, document D is reversed so that the reverse side of the document is presented at feeding exit 209.

Feed/eject roller 241 is then operated as described above to position the document on the platen glass table. The reverse side of document D is then copied as described above.

After the copying operation is completed, second gate 219 is positioned, as shown in FIG. 7G, so that it interrupts feeding path 207 and opens reversing path 229. Third gate 228 is moved downward, as shown in FIG. 7G, so that it interrupts the path from second gate 219 to first gate 217 through pinch roller 227 and opens a path from second gate 219 to eject rollers 231, 233.

In the configuration described above, feed/eject roller 241 is rotated in order to convey document D to the right from platen glass table 17 through second and third gates 219 and 228. When original D reaches eject rollers 231, 233, the eject rollers are rotated to convey document D onto the eject tray 109 on the upper surface of platen cover 101. At that point, feed/eject roller 241 stops rotating, and, first, second, and third gates 217, 219, and 228 are returned to the positions shown in FIG. 7B.

FIG. 8 shows a second embodiment of the present invention. The second embodiment is substantially identical to the first embodiment except that the ejecting path is formed differently.

After copying the reverse side of document D, first gate 217 is moved downward so that it interrupts feeding path 207. Second and third gates 219 and 228 are located in the same positions as during the feeding operation (shown in FIGS. 7C and 7D).

In this configuration, feed/eject roller 241 is rotated to convey document D to the right. When document D reaches upper and lower rollers 213 and 215, rollers 213 and 215 are rotated to convey document D along the surface of roller 213 from first gate 217 to eject rollers 231, 233 through third gate 228.

Other objects, features and advantages of the present invention will become apparent from the above detailed description. It should be understood, however, that the detailed description and specific examples, while indicating preferred embodiments of the invention, are given by way of illustrations only, since various changes and modifications within the spirit and scope of the invention will become apparent to those skilled in the art.

I claim:

1. A sheet conveying apparatus for conveying a sheet from a stack to a first position, removing said sheet from said first position, reversing it and reconveying it to the first position, said apparatus being further operative for conveying the reversed sheet from the first position to a second position, the apparatus comprising:
   first conveying means for conveying a sheet from the stack toward the first position;
   second conveying means for removing the sheet from the first position; and
   third conveying means disposed between said first conveying means and said second conveying means, said third conveying means being reversely drivable to cooperate with said first conveying means for moving said sheet in one direction from said stack to said first position, and with said second conveying means for removing said sheet from said first position, and means cooperable therewith for directing said sheet about said third conveying means into a reversed condition for return to said first position.

2. The apparatus of claim 1 wherein said third conveying means comprises:
   a pair of rollers rotatable in the first direction and in the second direction; and
   gate means positioned along the surface of one roller of said pair of rollers for defining a path of travel of the sheet along the surface of said one roller.

3. The apparatus of claim 2 wherein said gate means comprises a first gate, a second gate and a third gate, each of said gates being selectively positionable in an open position or a closed position.

4. The apparatus of claim 3 further comprising control means for individually opening and closing each of said gates.

5. The apparatus of claim 2 wherein said one roller of said pair of rollers has a first radius and the other roller of said pair of rollers has a second radius smaller than the first radius.

6. The apparatus of claim 4 wherein said control means opens said first gate and said second gate to define a path of travel from the stack to the first position.

7. The apparatus of claim 4 wherein said control means closes said second gate and said third gate to define a path of travel from the first position to the second position.

8. The apparatus of claim 4 wherein said control means closes said first gate and opens said second gate and said third gate to define a path of travel from the first position to the second position.

9. The apparatus of claim 4 wherein said control means closes said first gate and said third gate and opens said second gate to define a path of travel from the first position to an intermediate position along the surface of said one roller and wherein said control means closes said second gate to define a path of travel from the intermediate position to the first position.

10. A document feeding apparatus in an image forming machine for feeding a document from a stack onto a platen glass table of the image forming machine, reversing the document and refeeding the document onto the platen glass table and ejecting the document from the platen glass table onto a document tray, the apparatus comprising:
   first conveying means for conveying a document from the stack toward the platen glass table;
   second conveying means for removing the sheet from the platen glass table; and
   third conveying means disposed between said first conveying means and said second conveying means, said third conveying means being reversely drivable to cooperate with said first conveying means for moving said sheet in a first direction from said stack to said platen glass table and with said second conveying means for reversing said sheet from said platen glass table, and path-defining gate means for directing said sheet about said third conveying means into a reversed condition, said gate means including means operable to selectively move said sheet to said platen glass table or to said document tray.

11. An image forming apparatus for scanning a sheet supplied from a stack to a scanning position, forming an image corresponding to the scanned sheet and ejecting the sheet onto a tray, said apparatus comprising:
   first conveying means for conveying the sheet from the stack to the scanning position;
   scanning means for scanning the sheet conveyed by said first conveying means;
   second conveying means for removing the sheet from the scanning position; and
   third conveying means disposed between said first and second conveying means and being reversely drivable and operable, when driven in one direction, to cooperate with said first conveying means for conveying said sheet to the scanning position and, when driven in the reverse direction to cooperate with said second conveying means for removing said sheet from said scanning position, said third conveying means including means for reversing the condition of said sheet and for selectively returning it to said scanning position or to the tray.

12. A scanning apparatus comprising:
   a housing having a platen for placement of a sheet;
   means for scanning the sheet on the platen;
   first motive means for moving the sheet in a first direction from a stack toward a first position;
   second motive means, positioned at the first position, for moving the sheet in a second direction opposite to the first direction;
   central motive means for selectively operating in first and second modes of operation, wherein the central motive means in the first mode of operation is driven in a first direction to move the sheet from the stack to the first position, and wherein said central motive means in the second mode is driven in a second direction, opposite to the first direction, to reverse the sheet by moving it along a path which substantially circumscribes the central motive means;
   third motive means for moving the sheet from the first position onto the platen;

movable cover means for covering the sheet on the platen while the scanning means scans the sheet, and moving so that the movable covering means leaves the platen when the third motive means moves the sheet from the first position onto the platen; and fourth motive means for moving the sheet from the platen to the first position after the scanning means has scanned the sheet, wherein the sheet moved by the fourth motive means is moved by the central motive means in the second mode.

* * * * *